United States Patent
Nakatani et al.

(10) Patent No.: US 11,745,404 B2
(45) Date of Patent: Sep. 5, 2023

(54) RUBBER STRIP MANUFACTURING METHOD AND RUBBER STRIP MANUFACTURING APPARATUS

(71) Applicant: Toyo Tire Corporation, Itami (JP)

(72) Inventors: Keisuke Nakatani, Itami (JP); Naoki Mori, Itami (JP)

(73) Assignee: Toyo Tire Corporation, Itami (JP)

( * ) Notice: Subject to any disclaimer, the term of this patent is extended or adjusted under 35 U.S.C. 154(b) by 6 days.

(21) Appl. No.: 17/546,418

(22) Filed: Dec. 9, 2021

(65) Prior Publication Data

US 2022/0242024 A1    Aug. 4, 2022

(30) Foreign Application Priority Data

Jan. 29, 2021 (JP) ................. 2021-013710

(51) Int. Cl.
| | |
|---|---|
| *B29C 48/00* | (2019.01) |
| *B29C 48/35* | (2019.01) |
| *B29C 48/06* | (2019.01) |
| *B29L 7/00* | (2006.01) |

(52) U.S. Cl.
CPC .......... *B29C 48/0011* (2019.02); *B29C 48/06* (2019.02); *B29C 48/35* (2019.02); *B29L 2007/007* (2013.01)

(58) Field of Classification Search
CPC ..... B29C 48/0011; B29C 48/06; B29C 48/35; B29C 48/07; B29L 2007/007; B29K 2021/00

See application file for complete search history.

(56) References Cited

U.S. PATENT DOCUMENTS

| | | | | |
|---|---|---|---|---|
| 5,167,894 A | * | 12/1992 | Baumgarten | B29C 48/07 425/327 |
| 2005/0184426 A1 | * | 8/2005 | Bomba | B29C 48/08 264/166 |
| 2008/0105361 A1 | * | 5/2008 | Senbokuya | B29D 30/48 156/136 |
| 2009/0283203 A1 | * | 11/2009 | Marchini | B29C 43/245 156/117 |
| 2010/0307663 A1 | * | 12/2010 | Kudo | B29D 30/60 156/397 |
| 2017/0312966 A1 | * | 11/2017 | Haindl | B29C 48/92 |

FOREIGN PATENT DOCUMENTS

JP    2018-103895 A    7/2018

* cited by examiner

*Primary Examiner* — Larry W Thrower
*Assistant Examiner* — Anna Perkins
(74) *Attorney, Agent, or Firm* — WHDA, LLP

(57) ABSTRACT

A rubber strip manufacturing method that includes a step of extruding a rubber from an extrusion orifice of an extruder includes: a step of forming a long rubber member by extruding the rubber from the extrusion orifice that is circular; and a step of forming a rubber strip by passing the long rubber member through a gap between a pair of rotating rollers. The gap has a shape that is the widest in a central portion in a direction parallel to rotation axes of the rollers and that narrows as a distance from the central portion increases.

7 Claims, 11 Drawing Sheets

RUBBER STRIP MANUFACTURING METHOD AND RUBBER STRIP MANUFACTURING APPARATUS

CROSS-REFERENCE TO RELATED APPLICATION

This application is based on and claims the benefit of priority from Japanese Patent Application No. 2021-013710, filed on Jan. 29, 2021, the entire contents of which are incorporated herein by reference.

BACKGROUND OF THE INVENTION

1. Field of the Invention

The present invention relates to a rubber strip manufacturing method and a rubber strip manufacturing apparatus.

2. Description of the Related Art

As described in JP-A-2018-103895, there has been a method of molding a rubber member for a tire by spirally winding a rubber strip having a triangular cross section around a molding drum. The rubber strip used in the method is manufactured by extruding a rubber from an extruder having a triangular extrusion orifice.

However, in the method of extruding the rubber from an extrusion orifice having a shape in which both left and right sides are thin, such as a triangle, the rubber does not reach the left and right sides inside the extrusion orifice, and a flow velocity of the rubber is slow at both the left and right sides inside the extrusion orifice. Therefore, a cross-sectional shape of the rubber strip is likely to be distorted. When the cross-sectional shape of the rubber strip is distorted, an air layer is likely to be formed between the rubber strip and a surface of the molding drum, and the air layer is likely to remain as a void in the rubber member for a tire.

SUMMARY OF THE INVENTION

An object of the invention is to provide a method and an apparatus of manufacturing a rubber strip in which a cross-sectional shape is likely to meet a target.

A rubber strip manufacturing method according to an embodiment that includes a step of extruding a rubber from an extrusion orifice of an extruder includes: a step of forming a long rubber member by extruding the rubber from the extrusion orifice that is circular; and a step of forming a rubber strip by passing the long rubber member through a gap between a pair of rotating rollers. The gap has a shape that is the widest in a central portion in a direction parallel to rotation axes of the rollers and that narrows as a distance from the central portion increases.

A rubber strip manufacturing apparatus according to an embodiment including an extruder configured to extrude a long rubber member and an extrusion orifice for the long rubber member formed in the extruder includes a pair of rollers at a position in a traveling direction of the long rubber member extruded from the extrusion orifice. The long rubber member extruded from the extrusion orifice passes through a gap between the pair of rollers and is molded as a rubber strip, the extrusion orifice is circular, and the gap has a shape that is the widest in a central portion in a direction parallel to rotation axes of the rollers and that narrows as a distance from the central portion increases.

According to the rubber strip manufacturing method and the rubber strip manufacturing apparatus in the embodiments, a cross-sectional shape of the rubber strip is likely to meet a target.

DESCRIPTION OF THE PREFERRED EMBODIMENTS

An Embodiment will be described with reference to drawings. The embodiment described below is merely an example, and appropriate modifications without departing from the spirit of the invention are included in a scope of the invention.

Figure 1:
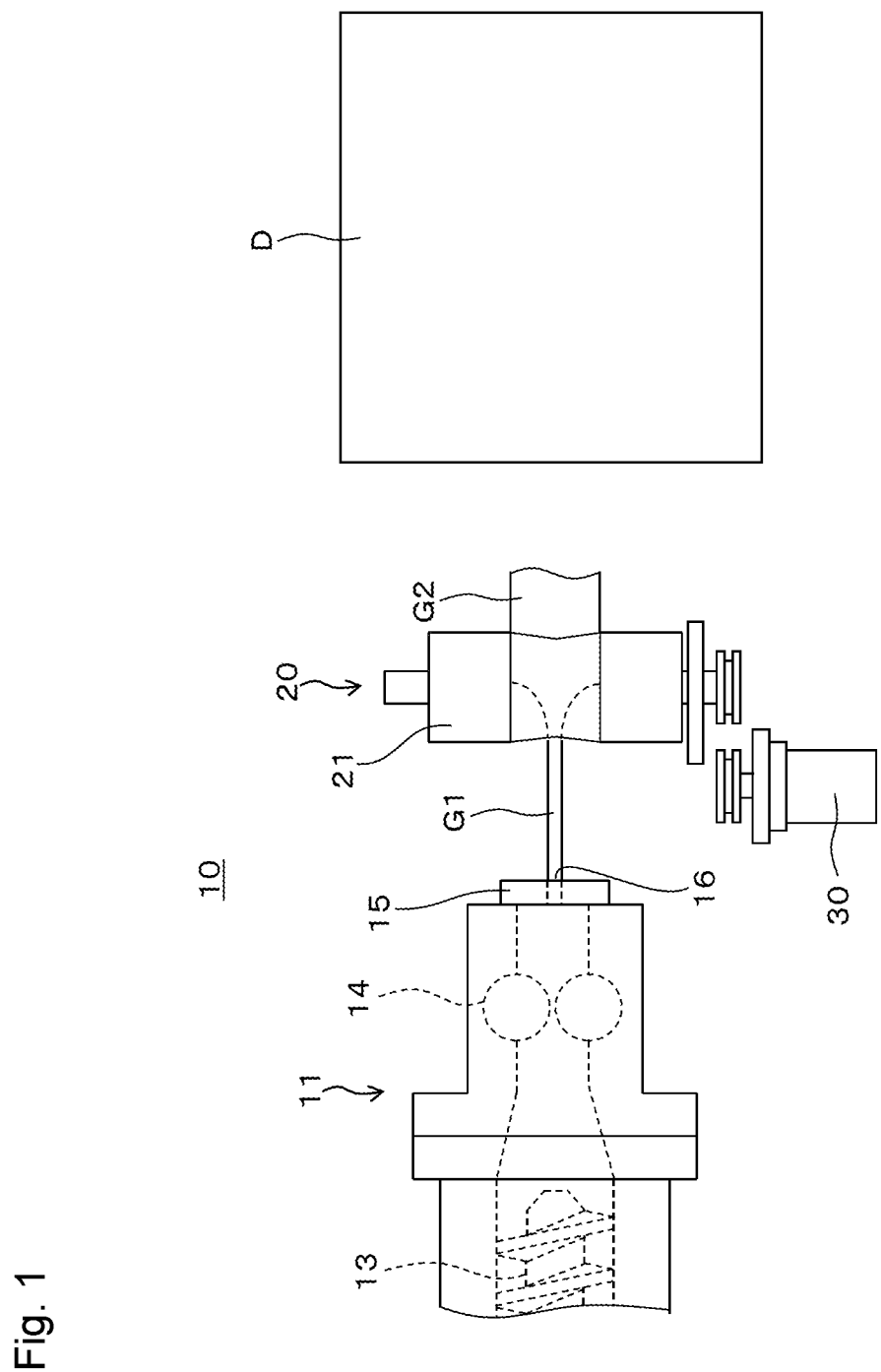
FIG. 1 is a plan view of a rubber strip manufacturing apparatus.
Figure 2:
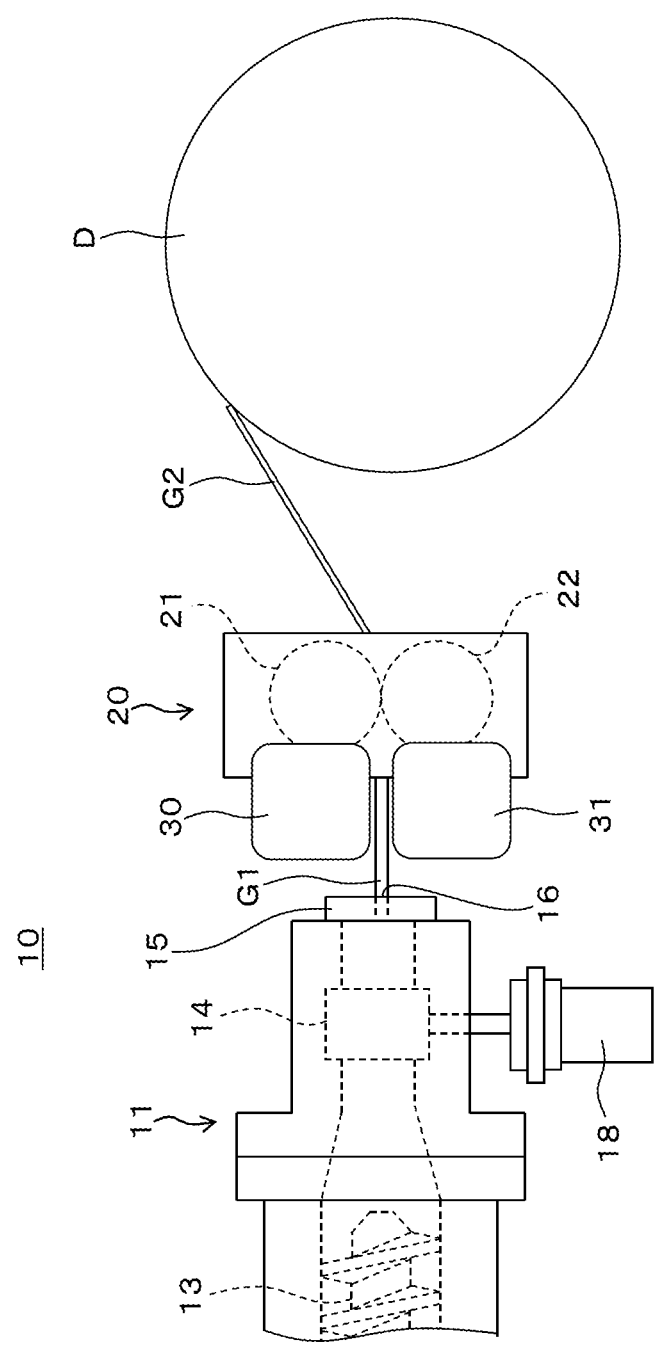
FIG. 2 is a front view of the rubber strip manufacturing apparatus.
Figure 3:
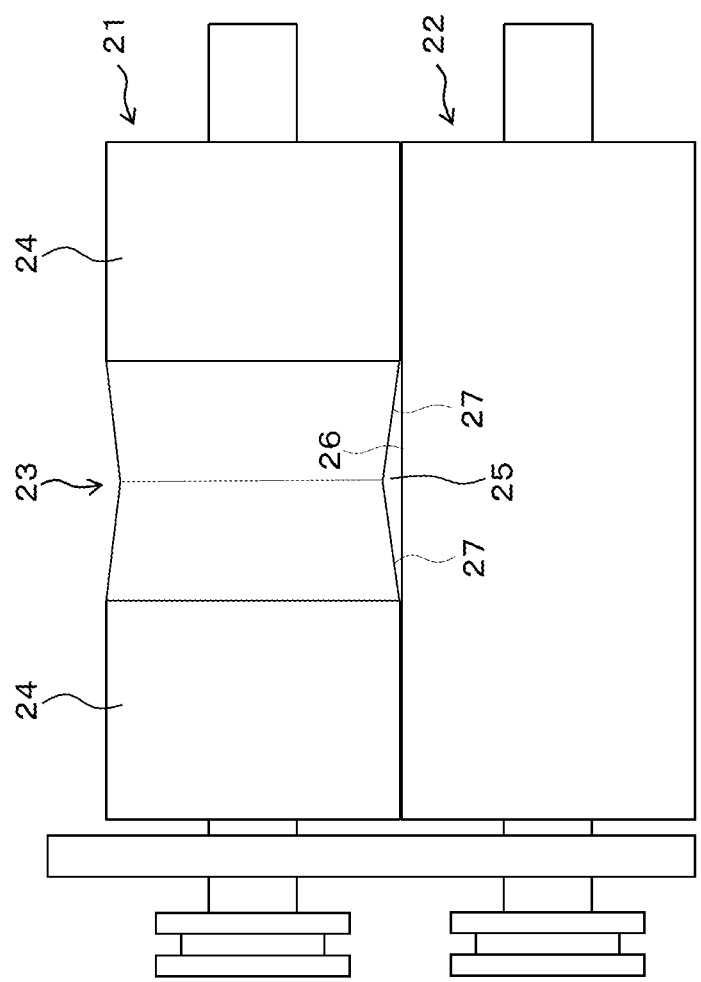
FIG. 3 is a right side view of a roller portion of the rubber strip manufacturing apparatus.

As shown in FIGS. 1 to 3, a rubber strip manufacturing apparatus 10 according to the embodiment includes an extruder 11 and a rolling device 20. A long rubber member G1 extruded from the extruder 11 passes through the rolling device 20 so that a rubber strip G2 is formed. The rubber strip G2 is wound around a molding drum D provided adjacent to the rubber strip manufacturing apparatus 10.

In the following description, an extrusion direction of the long rubber member G1 from the extruder 11 is defined as front. When viewed from the rolling device 20, the extruder 11 is in rear and the molding drum D is in front. In the following description, a left-right direction is a left-right direction in a case of facing forward.

A basic structure of the extruder 11 is the same as that of a general rubber extruder. A screw 13 is provided inside a main body 12 of the extruder 11, and a gear 14 of a gear pump that meters a rubber is provided in a front portion inside the main body 12. The screw 13 and the gear 14 are rotated by motors 17 and 18 (see FIG. 4), respectively. A ferrule 15 is provided at a front end of the main body 12. An extrusion orifice 16 of a rubber is open in the ferrule 15.

The extrusion orifice 16 has a circular shape (the same shape as the long rubber member G1 shown in FIG. 6) when viewed from the front. The circular shape in the description is not limited to a perfect circle, but includes a shape that can be approximated as a circle, for example, an ellipse whose major axis is 1.10% or less of the length of a minor axis, a regular polygon of dodecagon or more, and the like.

The rolling device 20 includes a pair of rollers 21 and 22 arranged one above the other. An upper roller is referred to as a grooved roller 21, and a lower roller is referred to as a grooveless roller 22. The grooved roller 21 and the grooveless roller 22 are arranged such that rotation axes of the grooved roller 21 and the grooveless roller 22 are parallel to each other. Extension directions of the rotation axes of the grooved roller 21 and the grooveless roller 22 are orthogonal to a front-rear direction and are horizontal.

The grooveless roller 22 is a cylindrical roller, and an outer peripheral surface of the grooveless roller 22 is a curved surface. The grooveless roller 22 has a constant outer diameter from one end to the other end in the left-right direction.

On the other hand, the grooved roller 21 is a substantially cylindrical roller, and a groove 23 is formed in a central portion in the left-right direction (a direction parallel to the rotation axes of the rollers 21 and 22). Left and right portions with respect to the groove 23 are cylindrical portions 24 having a same outer diameter as the grooveless roller 22. The grooved roller 21 has a smaller diameter in the groove 23 than in the cylindrical portion 24.

When viewed in the front-rear direction, the groove 23 is formed by two inclined surfaces 27. The inclined surfaces 27 are surfaces that gradually approach the outer diameter of the cylindrical portion 24 from the central portion to both sides in the left-right direction. Each of the inclined surfaces 27 is a curved surface that makes one round in the circumferential direction of the grooved roller 21. The shape of the groove 23 is symmetrical, and an outer diameter of the groove 23 is the smallest in the central portion in the left-right direction.

The cylindrical portion 24 of the grooved roller 21 is in line contact with the grooveless roller 22. A gap 25 is formed between the groove 23 of the grooved roller 21 and the grooveless roller 22. A shape of the gap 25 when viewed from the front-rear direction is the same as a targeted cross-sectional shape of the rubber strip G2, and is an isosceles triangle.

A base of the isosceles triangle is also an extension of a position where the grooved roller 21 is in line contact with the grooveless roller 22, and is a bottom 26 of the gap 25. A center (center of the circle) of the extrusion orifice 16 of the extruder 11 described above is located at a position (a position on an apex side of the isosceles triangle) higher than the bottom 26 of the gap 25.

An area of the gap 25 is smaller than an area of the extrusion orifice 16 of the extruder 11. Specifically, the area of the extrusion orifice 16 of the extruder 11 is 1.5 to 4.0 times the area of the gap 25. The area of the gap 25 is the area of the gap 25 on a surface (this surface passes through a position where the grooved roller 21 is in line contact with the grooveless roller 22) connecting the rotation axis of the grooved roller 21 and the rotation axis of the grooveless roller 22.

The grooved roller 21 and the grooveless roller 22 can be rotated independently by motors 30 and 31, respectively. However, the grooved roller 21 and the grooveless roller 22 are controlled such that surface speeds of outer peripheral surfaces during rotation are the same although rotation directions of the grooved roller 21 and the grooveless roller 22 are opposite.

Figure 4:
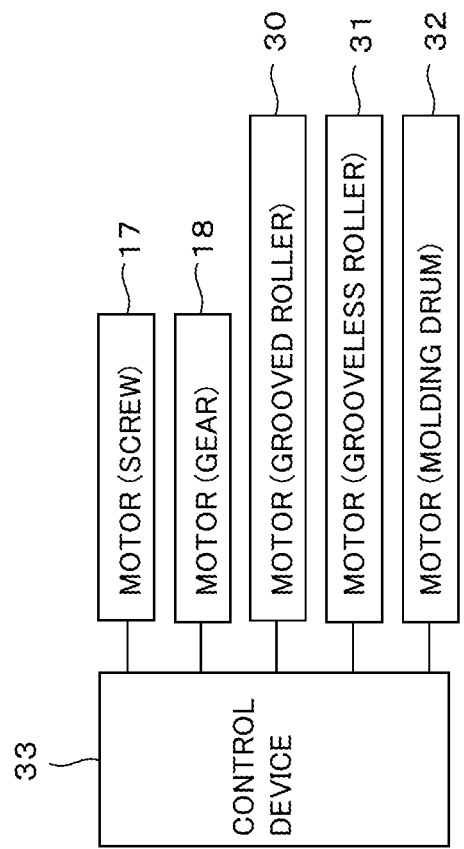
FIG. 4 is a block diagram centered on a control device.
Figure 5:
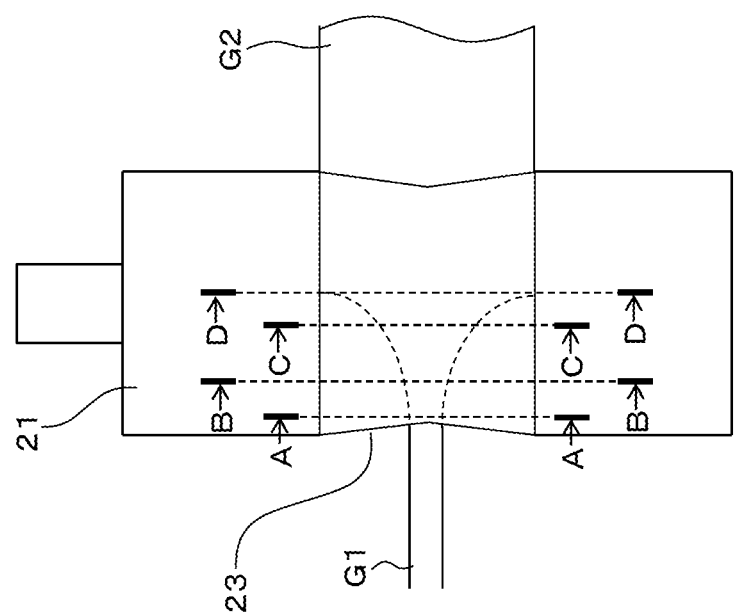
FIG. 5 is an enlarged view of a grooved roller portion in FIG. 1.

The apparatus used for manufacturing the rubber strip G2, such as the motors 30 and 31, the motor 17 of the screw 13 of the extruder 11 and the motor 18 of the gear 14 of the extruder 11, and motor 32 that rotates the molding drum D), is connected to a control device 33 as shown in FIG. 4.

The control device 33 can adjust a volume of the long rubber member G1 extruded from the extrusion orifice 16 per unit time by controlling rotations of the motor 17 of the screw 13 of the extruder 11 and the motor 18 of the gear 14 of the extruder 11. The control device 33 can also control rotations of the motor 30 of the grooved roller 21 and the motor 31 of the grooveless roller 22, and a rotation of the motor 32 of the molding drum D. The control device 33 winds the long rubber member G1 around the molding drum D while preventing the long rubber member G1 and the rubber strip G2 from loosening or breaking by controlling these motors 17, 18, 30, 31, and 32.

In a manufacture of the rubber strip G2, the control device 33 controls the motors 17 and 18 and the like to extrude the long rubber member G1 from the extrusion orifice 16 of the extruder 11. The long rubber member G1 extruded from the extrusion orifice 16 is supplied to the grooved roller 21 and the grooveless roller 22 of the rolling device 20 for rolling.

Figure 6:
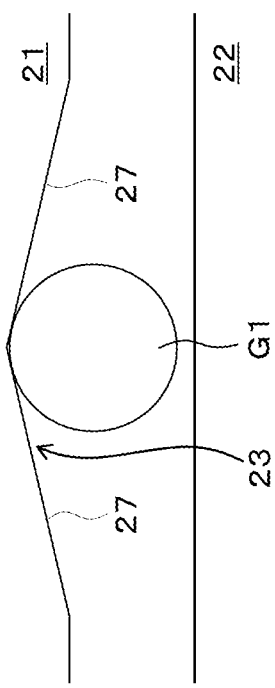
FIG. 6 is a cross-sectional view of a long rubber member at a position A-A in FIG. 5.

In the description, the center of the extrusion orifice 16 of the extruder 11 is located higher than the bottom 26 of the gap 25, and thus the long rubber member G1 traveling straight forward from the extrusion orifice 16 hits the upper grooved roller 21 before the lower grooveless roller 22 as shown in FIG. 6. The groove 23 of the grooved roller 21 is formed by the inclined surfaces 27 that gradually descend from the central portion to both sides in the left-right direction. Therefore, when a position of the long rubber member G1 deviates from the central portion of the groove 23 in the left-right direction, the long rubber member G1 hits the inclined surfaces 27 and is guided to the central portion in the left-right direction.

Figure 7:
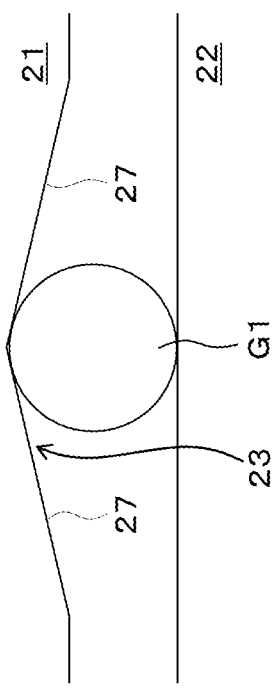
FIG. 7 is a cross-sectional view of the long rubber member at a position B-B in FIG. 5.

When the long rubber member G1 further advances forward, the long rubber member. G1 is sandwiched between the grooved roller 21 and the grooveless roller 22 as shown in FIG. 7. Also in this state, if the position of the long rubber member G1 deviates from the central portion of the groove 23 in the left-right direction, the long rubber member G1 hits the inclined surfaces 22 and is returned to the central portion in the left-right direction.

Figure 8:
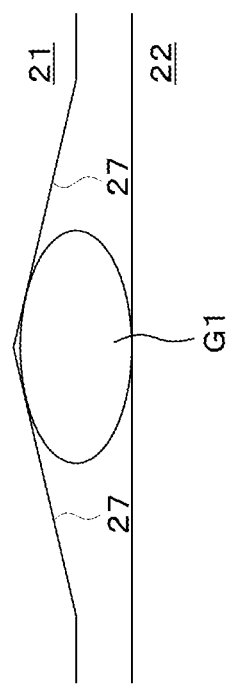
FIG. 8 is a cross-sectional view of the long rubber member at a position C-C in FIG. 5.

As the long rubber member G1 further advances forward, the long rubber member G1 is pressed by the grooved roller 21 and the grooveless roller 22 as shown in FIG. 8, and gradually becomes flat. The inclined surfaces 27 that push the long rubber member G1 from above are symmetrical, and thus the long rubber member G1 located at a center of the groove 23 in the left-right direction is pressed while maintaining an even shape on the left and right.

Figure 9:
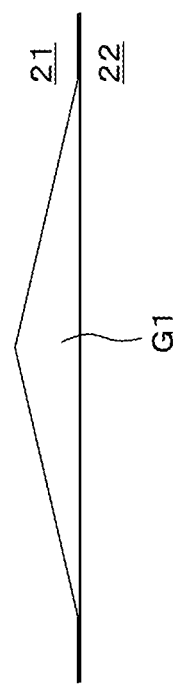
FIG. 9 is a cross-sectional view of the long rubber member at a position D-D in FIG. 5.

When the long rubber member G1 further advances forward and reaches the position where the grooved roller 21 is in line contact with the grooveless roller 22, the long rubber member G1 is sandwiched between the grooved roller 21 and the grooveless roller 22 as shown in FIG. 9, and a cross-sectional shape of the long rubber member G1 is an isosceles triangle that is the same as the shape of the gap 25 between the grooved roller 21 and the grooveless roller 22. In this way, the long rubber member G1 is molded as the rubber strip G2 having an isosceles triangle cross-sectional shape.

During molding of such a rubber strip G2, the control device 33 controls the pair of rollers 21 and 22 such that the pair of rollers 21 and 22 pull the long rubber member G1 forward. Specifically, the control device 33 executes control such that surface speeds of the pair of rollers 21 and 22 are larger than an extrusion speed of the long rubber member G1 from the extrusion orifice 16. Here, the surface speeds of the rollers 21 and 22 are a speed of outer peripheral surfaces of the rotating rollers 21 and 22 in a circumferential direction. The rollers 21 and 22 try to take up the long rubber member G1 at this surface speed. However, in reality, since a slight slippage occurs between the rollers 21 and 22 and the long rubber member G1, a take-up speed of the long rubber member G1 to the rollers 21 and 22 is smaller than the surface speeds of the rollers 21 and 22.

The control device 33 controls a volume V1 of the long rubber member G1 extruded from the extrusion orifice 16 per unit time by controlling the motor 17 of the screw 13 of the extruder 11 and the motor 18 of the gear 14 of the extruder 11. In addition, the control device 33 controls the motor 30 of the grooved roller 21 and the motor 31 of the grooveless roller 22, and executes control such that a calculated value V2 of (the area of the gap 25)×(the surface speeds of the rollers 21 and 22 during rotation) is larger than the volume V1.

It can be said that the calculated value V2 is a calculated volume of the rubber strip G2 that passes through the gap 25 between the pair of rollers 21 and 22 in a unit time. This calculated value V2 is larger than the volume V1, so that a force that pulls the long rubber member G1 forward is generated, and the long rubber member G1 can be stretched in a straight line or in a state close to the straight line between the extrusion orifice 16 of the extruder 11 and the pair of rollers 21 and 22.

The slight slippage occurs between the pair of rollers 21 and 22 and the long rubber member G1, and thus an actual volume of the rubber strip G2 passing through the gap 25 between the pair of rollers 21 and 22 per unit time is smaller than the calculated value V2. The calculated value V2 is preferably 1.1 to 1.3 times the volume V1.

The rubber strip G2 that has passed through the pair of rollers 21 and 22 further advances and is wound around the molding drum D. A tip of the rubber strip G2 may be attached to the molding drum D by a worker or by an attachment device not shown. The rubber strip G2 spirally wound around the molding drum D serves as a tire component such as sidewall rubber.

As described above, in the present embodiment, the rubber is extruded from the circular extrusion orifice 16 to form the long rubber member G1, and the long rubber member G1 is passed through the gap 25 between the pair of rotating rollers 21 and 22 to form the rubber strip G2. Here, the gap 25 has a shape that is the widest vertically in the central portion in the left-right direction and that narrows vertically as a distance from the central portion increases. Therefore, the long rubber member G1 that has begun to enter the gap 25 is easily guided to the central portion of the gap 25 in the left-right direction, and when the long rubber member G1 further advances forward and is pressed by the pair of rollers 21 and 22, the long rubber member G1 is pressed to the left and right in excellent balance. Therefore, the rubber is likely to spread over an entire region including corners of the gap 25, and the cross-sectional shape of the rubber strip G2 is likely to meet a target.

In the present embodiment, the gap 25 is a triangle, but the rubber is likely to reach the corners of the gap 25 near the apex of the triangle. Therefore, in the gap 25, corners of the rubber strip G2 in which a triangular cross section is molded are less likely to be chipped.

In the present embodiment, the gap 25 is the isosceles triangle, and upper surfaces of the gap 25 from the central portion to left and right ends in the left-right direction are the inclined surfaces 27. Therefore, the long rubber member G1 toward the gap 25 is easily guided to the central portion of the gap 25 in the left-right direction.

The pair of rollers 21 and 22 rotate while pulling the long rubber member G1, and thus the long rubber member G1 is unlikely to loosen or meander between the extrusion orifice 16 of the extruder 11 and the pair of rollers 21 and 22. Therefore, the long rubber member G1 is likely to enter a center of the gap 25 between the pair of rollers 21 and 22 in a state of being close to a straight line. As a result, the cross-sectional shape of the rubber strip G2 is likely to meet the target.

Here, the calculated value V2 calculated by (the area of the gap 25)×(the surface speeds of the rollers 21 and 22) is larger than the volume V1 of the long rubber member G1 extruded from the extrusion orifice 16 per unit time. Therefore, the pair of rollers 21 and 22 can pull the long rubber member G1. In particular, if the calculated value V2 is 1.1 to 1.3 times the volume V1, an appropriate tension is applied to the long rubber member G1, and the long rubber member G1 is less likely to be cut.

If the area of the extrusion orifice 16 is 1.5 times or more the area of the gap 25 between the pair of rollers 21 and 22, the amount of the long rubber member G1 extruded from the extrusion orifice 16 becomes sufficient with respect to the amount of the long rubber member G1 that the pair of rollers 21 and 22 tries to send forward, and the long rubber member G1 is less likely to be cut between the extrusion orifice 16 and the pair of rollers 21 and 22.

If the area of the extrusion orifice 16 is 4.0 times or less the area of the gap 25 between the pair of rollers 21 and 22, the amount of the long rubber member G1 extruded from the extrusion orifice 16 does not become excessive with respect to the amount of the long rubber member G1 that the pair of rollers 21 and 22 tries to send forward, and problems such as an accumulation of the long rubber member G1 at the pair of rollers 21 and 22 are unlikely to occur.

If the area of the extrusion orifice 16 is within a range of 1.5 times or more and 4.0 times or less the area of the gap 25 between the pair of rollers 21 and 22, and the calculated value V2 is 1.1 times to 1.3 times the volume V1, a difference between a speed of the long rubber member G1 that the pair of rollers 21 and 22 tries to send forward and a speed of the long rubber member G1 that is extruded from the extrusion orifice 16 does not become too large, and the long rubber member G1 is particularly less likely to be cut between the extrusion orifice 16 and the pair of rollers 21 and 22.

Since the center of the extrusion orifice 16 is located higher than the bottom 26 of the gap 25, the long rubber member G1 traveling straight forward from the extrusion orifice 16 hits the groove 23 of the grooved roller 21 before the grooveless roller 22. Therefore, when the position of the long rubber member C deviates from the central portion of the groove 23 in the left-right direction, the long rubber member G1 hits the inclined surfaces 27 of the groove 23 and is easily guided to the central portion in the left-right direction.

The rubber strip manufacturing apparatus 10 according to the present embodiment has a structure in which the pair of rollers 21 and 22 are provided at positions in a traveling direction of the long rubber member G1 extruded from the extrusion orifice 16 of the extruder 11, and the long rubber member G1 extruded from the extrusion orifice 16 passes through the gap 25 between the pair of rollers 21 and 22 and is molded as the rubber strip G2. Furthermore, the extrusion orifice 16 is circular, the gap 25 between the pair of rollers 21 and 22 has a shape that is the widest in the central portion in the direction (the left-right direction) parallel to the rotation axes of the rollers 21 and 22 and that narrows as the distance from the central portion increases.

With such a structure, the long rubber member G1 that has been extruded from the extrusion orifice 16 and has began to enter the gap 25 of the pair of rollers 21 and 22 is easily guided to the central portion of the gap 25 in the left-right direction. When the long rubber member G1 further advances forward and is pressed by the pair of rollers 21 and 22, the long rubber member G1 is pressed to the left and right in excellent balance. Therefore, the rubber easily spreads over the entire region including the corners of the gap 25, and the cross-sectional shape of the rubber strip G2 is likely to meet the target.

Various changes can be made on the above embodiment. Modifications will be described below.

First Modification

A shape of a gap between the grooved roller 21 and the grooveless roller 22 may be the widest in a central portion in a direction parallel to rotation axes of these rollers 21 and 22, and may narrow as a distance from the central portion increases. However, a symmetrical shape is preferable.

Figure 10:
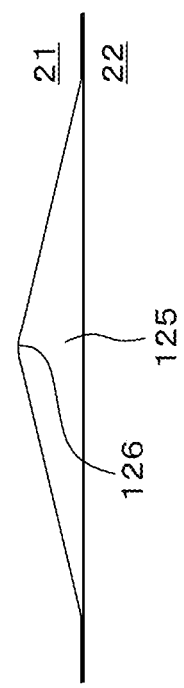
FIG. 10 is a diagram showing a gap according to a modification.
Figure 11:
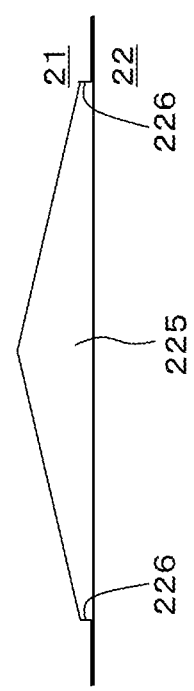
FIG. 11 is a diagram showing a gap according to another modification.

For example, a gap 125 in FIG. 10 is approximately an isosceles triangle, but an apex angle is a rounded R surface 126. A gap 225 in FIG. 11 is approximately an isosceles triangle, but a rising portion 226 is formed at a base angle.

A cross-sectional shape of the rubber strip G2 that has passed through these gaps 125 and 225 is the same as that of the gaps 125 and 225.

Second Modification

As an extruder for the long rubber member G1, a machine without a ferrule can also be used. In a case of extruding the long rubber member G1 from the extruder without the ferrule, a hole of an extruder main body through which the long rubber member G1 is extruded may be a circular extrusion orifice.

What is claimed is:

1. A rubber strip manufacturing method that includes a step of extruding a rubber from an extrusion orifice of an extruder, the rubber strip manufacturing method comprising:
    a step of forming an elongated rubber member by extruding the rubber from the extrusion orifice that is circular; and
    a step of forming a rubber strip by passing the elongated rubber member through a gap between a pair of rotating rollers, wherein
    the pair of rotating rollers includes an upper grooved roller and a lower grooveless roller, and the elongated rubber member traveling forward from the extrusion orifice is sandwiched between the upper grooved roller and the lower grooveless roller;
    the grooved roller includes a groove having inclined surfaces, and the inclined surfaces guide the elongated rubber member at a central position through the gap;
    the groove on the upper grooved roller lines up with a surface of the lower grooveless roller, forming the gap where the groove locates; and
    the gap is approximately an isosceles triangle with the central position located at an apex of the isosceles triangle.

2. The rubber strip manufacturing method according to claim 1, wherein
    surface speeds of the rollers during rotation are larger than an extrusion speed of the elongated rubber member from the extrusion orifice.

3. The rubber strip manufacturing method according to claim 1, wherein
    a value of (an area of the gap)×(surface speeds of the rollers during rotation) is greater than a volume of the elongated rubber member extruded from the extrusion orifice per unit time.

4. The rubber strip manufacturing method according to claim 1, wherein
    an area of the extrusion orifice is 1.5 times to 4.0 times an area of the gap.

5. The rubber strip manufacturing method according to claim 1, wherein
    the pair of rollers are arranged one above the other, and a center of the extrusion orifice is located higher than a bottom of the gap.

6. The rubber strip manufacturing method according to claim 1, wherein
    the apex of the isosceles triangle is rounded.

7. The rubber strip manufacturing method according to claim 1, wherein the elongated rubber member traveling forward from the extrusion orifice hits the upper grooved roller before the lower grooveless roller.

* * * * *